United States Patent Office 2,935,443
Patented May 3, 1960

---

2,935,443

METHOD OF PROTECTING MATERIAL AGAINST FUNGI COMPRISING APPLYING A HEAVY METAL COMPLEX OF A 1,2-NAPHTHOQUINONE 1-OXIME

Glentworth Lamb, Stamford, and James W. Clapp, Darien, Conn., assignors to American Cyanamid Company, New York, N.Y., a corporation of Maine No Drawing. Application August 20, 1958
Serial No. 756,087

8 Claims. (Cl. 167—32)

This invention relates to fungicides. More particularly, it relates to an improved method and composition for the prevention and control of fungus infestations of agricultural, organic and related articles.

In accordance with the present invention, it has been surprisingly found that fungus infestations of seeds, plants, fruits and the like can be prevented and controlled to an unusual degree by the use of a composition containing as an active fungicidal ingredient at least one heavy metal complex of a 1,2-naphthoquinone 1-oxime of the formula

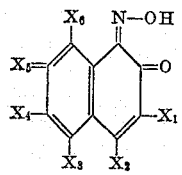

in which $X_1$–$X_6$ are each selected from hydrogen, hydroxy, alkoxy and halogen.

Representative of the heavy metals intended to be included herein are copper, zinc, manganese, nickel, cobalt, iron, chromium, cadmium, tin, mercury, silver, and lead.

Typical examples of 1,2-naphthoquinone 1-oximes with which the heavy metals may be complexed are 1,2-naphthoquinone 1-oxime, 3-bromo-1,2-naphthoquinone 1-oxime, 6-bromo-1,2-naphthoquinone 1-oxime, 3,6-dibromo - 1,2 - naphthoquinone 1 - oxime, 3 - chloro - 1,2 - naphthoquinone 1-oxime, 4-chloro-1,2-naphthoquinone 1-oxime, 6-chloro-1,2-naphthoquinone 1-oxime, 7-ethoxy-1,2-naphthoquinone 1-oxime, 6-hydroxy-1,2-naphthoquinone 1-oxime, 3-hydroxy-1,2-naphthoquinone 1-oxime, 7-hydroxy-1,2-naphthoquinone 1-oxime, 6-methoxy-1,2-naphthoquinone 1-oxime, 7-methoxy-1,2-naphthoquinone 1-oxime, 3-bromo-7-hydroxy-1,2-naphthoquinone 1-oxime, 6-bromo-7-hydroxy-1,2-naphthoquinone 1-oxime, 6,7-dibromo-3-hydroxy-1,2-naphthoquinone 1-oxime, 6,7-dihydroxy-3-methoxy-1,2-naphthoquinone 1-oxime, and the like.

The fungicides of this invention may be prepared in several ways. One method by which they may be readily synthesized is by adding an aqueous solution of an equivalent weight of a salt of the metal to an aqueous solution of the oxime containing an equivalent weight of an alkali metal hydroxide. The product precipitates immediately and is readily recovered.

It is an advantage of the present invention that the fungicidal compounds are effective in extremely dilute concentrations. Accordingly, they may be employed as compositions comprising any of a variety of suitable carriers or diluents. Such compositions can be prepared either as a suspension in a suitable non-solvent or as a dust. A suspension or dispersion of the heavy metal complex in a non-solvent therefor, such as water, is advantageously prepared for plant foliage treatment.

For the protection of fruits, seeds, plant tubers and the like during storage, it is advantageous to treat them by employing an aqueous emulsion of the fungicide. An emulsion may be formed by dissolving the fungicide in an oil and emulsifying the solution in water. The oil which can be used as a solvent for the fungicide of the present invention is a hydrocarbon, as, for example, benzene or toluene or a halogenated hydrocarbon, such as chlorobenzene, chloroform, fluorotrichloromethane or dichlorodifluoromethane.

The compounds of the present invention also may be applied to plant foliage by the aerosol method. Solutions for the aerosol treatment are prepared either by dissolving the heavy metal complex directly in a highly volatile liquid carrier, such as trichlormethane, or by dissolving it in a less volatile solvent as for example, benzene, and then mixing such solution with the highly volatile liquid aerosol carrier.

Fungicidal dust may also be prepared by mixing the instant fungicides with dusting materials as for example, clay, pyrophyllite, bentonite, pumice, fuller's earth and the like. Accordingly, seed can be protected from soil organisms harmful to them by incorporating the present compounds with a solid carrier and mixing the composition with the seed as by tumbling.

The dosage employed in any particular case will necessarily vary. It is dependent upon the particular heavy metal complex employed, the material being treated and the method of application. In addition, in the case of application to living vegetation and seeds, the dosage is also dependent upon the susceptibility of the particular vegetation to the particular heavy metal complex employed, the state and condition of growth of the vegetation as well as climatic conditions prevailing. The optimum dosage employed in each case can readily be determined by those skilled in the art by conventional means. In general, when applied as a foliar spray to vegetation, a dosage rate of from 1–4 lbs. of fungicide per acre is adequate. When applied to seed, a dosage of about 0.5–4 oz./100 pounds of seed is generally employed. The usual practice is to employ about 0.0005–0.02 pound of a heavy metal complex of a 1-oxime per pound of organic matter being treated.

The concentration of fungicide to inert carrier or diluent may likewise be varied. In general, up to about 10% by weight of the complexed compound based upon the weight of the inert carrier is generally quite satisfactory. In most cases from about 0.01% to 1% of active ingredient and preferably about 0.15% is adequate for aqueous dispersions. For dust compositions, about 5% of active ingredient is adequate for most applications.

When the fungicidal compounds are employed in aqueous suspensions, the compositions may advantageously contain a surface active agent. Examples of such surface active agents well known in the art include the fatty acid esters of polyhydric alcohols, the sodium salt of a polymerized propyl naphthalene sulfonic acid formed by condensing formaldehyde with propyl naphthalene sodium sulfonate, the alkylarylpolyether alcohols, and the like. Usually, a good practice is to add from one to about five parts of dispersing agent per 100 parts of fungicide compound.

In addition to a heavy metal complex of 1,2-naphthoquinone 1-oxime or of a substituted 1,2-naphthoquinone 1-oxime, a composition according to this invention may also contain other active ingredients which, in addition may serve as the carrier. These active ingredients in admixture can be herbicides, insecticides, fertilizers and the like. Thus, for example, an effective dose of a fungicide according to this invention and an insecticide such as DDT suspended in water in the presence of a dispersing agent can be employed as a multipurpose fungicidal preparation.

The term fungicide as used in the specification and claims is meant to include not only a material having the property of destroying fungi, but also the property of inhibiting the germination of spores of the fungi. It is an advantage of the present invention that the compositions thereof have both properties to an unusual degree.

The following examples illustrate the preparation of the fungicidal compounds of this invention. All parts are by weight unless otherwise indicated.

EXAMPLE 1

*Iron$^{III}$ complex of 1,2-naphthoquinone 1-oxime*

A mixture of 17.3 parts of 1,2-naphthoquinone 1-oxime and 500 parts by volume of 0.2 N potassium hydroxide is stirred thoroughly and warmed briefly to about 50° C. The solution is filtered, and the filtrate stirred well during addition of a solution of 13.6 parts of ferric chloride hexahydrate in 50 parts of water. After thorough mixing, the black powdery precipitate is filtered, washed and dried to give 18 parts of the iron complex of 1,2-naphthoquinone 1-oxime.

EXAMPLE 2

*Manganese$^{II}$ complex of 1,2-naphthoquinone 1-oxime*

A mixture of 17.3 parts of 1,2-naphthoquinone 1-oxime and 500 parts by volume of 0.2 N potassium hydroxide is stirred thoroughly, with brief warming to about 50° C. The solution is filtered, and the filtrate stirred during addition of a solution of 12.2 parts of manganese acetate tetrahydrate in about 50 parts of water. The dark greenish powery precipitate is filtered, washed with water, and dried to give 19 parts of the manganese complex of 1,2-naphthoquinone 1-oxime.

EXAMPLE 3

*Copper complex of 7-methoxy-1,2-naphthoquinone 1-oxime*

A mixture of 1.0 part of 7-methoxy-1,2-naphthoquinone 1-oxime and 25 parts by volume of 0.2 N aqueous potassium hydroxide solution is warmed, stirred, and filtered. A solution of 0.63 part of copper sulfate pentahydrate in 5 parts of water is added gradually with stirring to the filtrate. The complex precipitates at once, and is filtered, washed, and dried.

Other metal complexes employing other metals and/or other substituted 1,2-naphthoquinone 1-oximes can be readily prepared in the same manner.

The following examples illustrate the fungicidal activity of the compounds of this invention. All parts are by weight unless otherwise indicated.

EXAMPLE 4

Tests are conducted to determine the fungicidal activity of the compounds of the present invention on spores of *Sclerotinia fructigena* and *Stemphylium sarcinaeforme*, which are both fungi and parasitic on stone fruits and clover, respectively. These organisms are cultured on potato dextrose agar slants. Spores are obtained in abundance from 14 day old cultures of *Stemphylium sarcinaeforme* and 7 day old cultures of *Sclerotinia fructigena*. Aqueous suspensions of 0.01%, 0.001% and 0.0001% concentrations of the copper and silver complexes of 1,2-naphthoquinone 1-oxime are then prepared. The spores, washed from the slants with distilled water, are added to these suspensions to provide a concentration of 50,000 spores/ml. The suspensions are then agitated for 24 hours on a tumbling machine, after which they are examined for number of spores killed. No fungus growth is observed in any of the preparations.

EXAMPLE 5

Two week old cucumber plants of the Green Prolific variety are sprayed to run-off with acetone-water suspensions containing the compounds of Table I in varying concentrations. After the spray deposits dry, the plants are inoculated with a cordial suspension of cucumber anthracnose fungus (*Colletotrichum lagenarium*). Results appear in Table I.

TABLE I

| Compound | Conc. (p.p.m.) | Number of lesions | Percent Disease |
|---|---|---|---|
| Control (50% Acetone in $H_2O$) | | 281 | 100 |
| Cu Complex of 1,2-Naphthoquinone 1-oxime | 25 | 31 | 11 |
|  | 10 | 88 | 31.3 |
| Zn Complex of 1,2-Naphthoquinone 1-oxime | 25 | 45 | 16 |
|  | 10 | 114 | 40.6 |
| Mn Complex of 1,2-Naphthoquinone 1-oxime | 25 | 101 | 36 |
|  | 10 | 169 | 60.2 |
| Fe Complex of 1,2-Naphthoquinone 1-oxime | 25 | 120 | 42.7 |
|  | 10 | 216 | 77.0 |
| Cu Complex of 3,6-Dibromo-1,2-Naphthoquinone 1-oxime | 10 | 193 | 68.6 |
| Cu Complex of of 3-Bromo-1,2-Naphthoquinone 1-oxime | 10 | 173 | 61.6 |
| Cu Complex of 7-Methoxy-1,2-Naphthoquinone 1-oxime | 10 | 198 | 70.5 |

Other heavy metal complexes of 1,2-naphthoquinone 1-oxime and substituted 1,2-naphthoquinone 1-oximes demonstrate fungicidal activity when employed in a similar manner.

By a "heavy metal complex of a 1,2-naphthoquinone 1-oxime" as employed herein is meant a heavy metal complex of 1,2-naphthoquinone 1-oxime or of a substituted 1,2-naphthoquinone 1-oxime.

We claim:

1. A method for protecting organic materials susceptible to attack by fungi which comprises applying to said material at least one heavy metal complex of a 1,2-naphthoquinone 1-oxime.

2. A method for protecting organic materials susceptible to attack by fungi which comprises applying to said material at least one heavy metal complex of a 1,2-naphthoquinone 1-oxime, said 1-oxime being represented by the formula

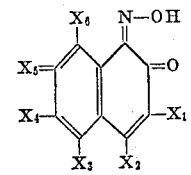

in which $X_1$–$X_6$ are each selected from the group consisting of hydrogen, hydroxy, alkoxy and halogen.

3. A method according to claim 2 in which the 1-oxime is 1,2-naphthoquinone 1-oxime.

4. A method according to claim 3 in which the metal is copper.

5. A method according to claim 3 in which the metal is zinc.

6. A method according to claim 3 in which the metal is silver.

7. A method according to claim 2 in which the 1-oxime is a 3-halo-1,2-naphthoquinone 1-oxime.

8. A method according to claim 7 in which the metal is copper.

References Cited in the file of this patent

Reddish: "Antiseptics, Disenfectants, Fungicides and Sterilization," 2nd ed., pp. 308–17 (1957).
Chem. Abst., vol. 1, pp. 570–571, 1907.
Chem. Abst., vol. 15, pp. 2414–2416, 1921.
Chem. Abst., vol. 17, p. 1218, 1923.
Chem. Abst., vol. 41, p. 1728d, 1947.